(12) United States Patent
Singler et al.

(10) Patent No.: US 7,685,603 B2
(45) Date of Patent: Mar. 23, 2010

(54) SELECTING CLIENT ADAPTERS

(75) Inventors: Joerg Singler, Messkirch (DE); Stefan Beck, Hirschberg (DE)

(73) Assignee: SAP AG, Walldorf (DE)

( * ) Notice: Subject to any disclaimer, the term of this patent is extended or adjusted under 35 U.S.C. 154(b) by 1016 days.

(21) Appl. No.: 10/658,683

(22) Filed: Sep. 8, 2003

(65) Prior Publication Data

US 2005/0055700 A1    Mar. 10, 2005

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/311
(58) Field of Classification Search ................ 719/311, 719/316
See application file for complete search history.

(56) References Cited

U.S. PATENT DOCUMENTS

| | | | | |
|---|---|---|---|---|
| 5,644,720 A * | 7/1997 | Boll et al. | ..................... | 709/227 |
| 5,706,429 A * | 1/1998 | Lai et al. | ..................... | 709/230 |
| 5,802,306 A * | 9/1998 | Hunt | ........................... | 709/228 |
| 5,999,979 A * | 12/1999 | Vellanki et al. | ............. | 709/232 |
| 6,003,094 A * | 12/1999 | Dean | ........................... | 719/315 |
| 6,237,041 B1 * | 5/2001 | H.ang..ang.l et al. | ........ | 709/246 |
| 6,300,947 B1 * | 10/2001 | Kanevsky | .................... | 715/866 |
| 6,912,588 B1 * | 6/2005 | Jardin et al. | ................ | 709/238 |
| 7,003,773 B2 * | 2/2006 | Hoennig et al. | ............. | 719/311 |
| 7,213,208 B2 * | 5/2007 | Reichel et al. | .............. | 715/746 |
| 7,216,142 B2 * | 5/2007 | Whipple et al. | ............. | 709/203 |
| 7,237,139 B2 * | 6/2007 | Hamilton et al. | ................ | 714/4 |
| 7,356,562 B2 * | 4/2008 | Yoon | ........................... | 709/203 |
| 7,380,250 B2 * | 5/2008 | Schechter et al. | ........... | 719/328 |
| 7,424,539 B2 * | 9/2008 | Gbadegesin | ................. | 709/227 |
| 7,484,243 B2 * | 1/2009 | Dankovich et al. | ............. | 726/8 |
| 2001/0047383 A1 * | 11/2001 | Dutta | ........................ | 709/201 |
| 2002/0038340 A1 * | 3/2002 | Whipple et al. | ............. | 709/203 |
| 2002/0078371 A1 * | 6/2002 | Heilig et al. | ................ | 713/200 |
| 2002/0133635 A1 * | 9/2002 | Schechter et al. | ........... | 709/310 |
| 2003/0033356 A1 * | 2/2003 | Tran et al. | .................... | 709/203 |

(Continued)

OTHER PUBLICATIONS

Chia-Chu Chiang , "Development of reusable components through the use of adapters," Jan. 2003, System Sciences, Proceedings of the 36th Annual Hawaii International Conference on, vol., Iss., 6-9, pp. 10 pp.*

*Primary Examiner*—Hyung S Sough
*Assistant Examiner*—KimbleAnn Verdi
(74) *Attorney, Agent, or Firm*—Fountainhead Law Group PC (57) ABSTRACT

Methods and apparatus, including computer program products, for selecting client adapters. A client abstraction layer identifies one or more selection data elements in a client request and selects an adapter to communicate with the client based on the selection data elements, wherein each selection data element specifies an adapter type, a client type, or data describing the client. The adapter can be selected based on a multi-stage selection process that involves performing an adapter-request process for selecting an adapter based on the selection data elements that specify the adapter type; if the adapter-request process fails to select an adapter, performing a client-identification process for selecting an adapter based on the selection data elements that specify the client type; and if the client-identification process fails to select an adapter, performing a client-description process for selecting an adapter based on the selection data elements that specify data describing the client.

23 Claims, 4 Drawing Sheets

U.S. PATENT DOCUMENTS

| | | | |
|---|---|---|---|
| 2003/0093551 A1* | 5/2003 | Taylor et al. | 709/237 |
| 2004/0167986 A1* | 8/2004 | Gilfix et al. | 709/230 |
| 2004/0221002 A1* | 11/2004 | Karim | 709/203 |
| 2004/0225656 A1* | 11/2004 | Sarkar | 707/9 |
| 2008/0034200 A1* | 2/2008 | Polcha et al. | 713/153 |

* cited by examiner

FIG. 1

POST http://p70780:8080/WebDynpro/Servlet/_webdynpro_test_OVS/OVSTestApp HTTP/1.1 ⎯200

Accept: image/gif, image/x-xbitmap, image/jpeg, image/pjpeg, application/vnd.ms-powerpoint, application/vnd.ms-excel, application/msword, application/x-shockwave-flash, */* http://p70780:8080/WebDynpro/Servlet/_webdynpro_test_OVS/OVSTestApp
Accept-Language: en-us
Content-Type: application/x-www-form-urlencoded
Accept-Encoding: gzip, deflate
User-Agent: Mozilla/4.0 (compatible; MSIE 6.0; Windows NT 5.0; .NET CLR 1.0.3705)
Host: p70780:8080
Content-Length: 390
Proxy-Connection: Keep-Alive
Pragma: no-cache
Cookie: JSESSIONID=AFA7A7B22A4FA84764B758B9EB2D68B1 viewState.KHAIJIIB.ResultView.result.firstVisibleRow=0&data.KHAIJIIB.ResultView.out.leadSelection=0&event.type=Application&event.name=LeadSelected&event.srcid=KHAIJIIB.ResultView.result&event.viewid=KHAIJIIB.ResultView&event.param.row=0&event.param.col=1_column&event.param.uiEvent=onLeadSelect&sap.session.client_window_id=2.146a73375&sap.session.no_refresh=true&sap.session.window_id=KHAI3&sap.session.adapter=JavaScript ⎯210 ⎯220

FIG. 2

```
GET /webdynpro/dispatcher/local/FileUpLoad/App?sap.csf.dev=1 HTTP/1.1
Accept: image/gif, image/x-xbitmap, image/jpeg, image/pjpeg,
application/vnd.ms-powerpoint, application/vnd.ms-excel,
application/msword, application/x-shockwave-flash, */*
Accept-Language: en-us
Accept-Encoding: gzip, deflate
User-Agent: Mozilla/4.0 (compatible; MSIE 6.0; Windows NT 5.0; .NET CLR
1.0.3705)
Host: p78526:50000
Proxy-Connection: Keep-Alive
```

300 (callout to GET line)
310 (brace around User-Agent through Host lines)

SELECTING CLIENT ADAPTERS

BACKGROUND

The present invention relates to data processing by digital computer, and more particularly to client-server communication.

Client-server applications typically have two components: a server or back-end component that provides the application logic, and a client or front-end component through which a user interacts with the application. The server component, which is sometimes referred to simply as the application itself, is usually executed on a computer that is specifically configured as a server. The server computer can have resources that provide high computational and communication bandwidth, for example, so that it can execute multiple applications that interact with numerous clients. The client component can be executed on a separate computer, although in some instances the server component and the client component may be executed on the same computer.

In a heterogeneous system landscape, a variety of different types of clients may initiate sessions and interact with a server. In such a situation, the server and the applications running on the server can tailor their functionality to match the type of client being served. For example, a server and its applications can produce output (e.g., a user interface) specifically formatted for a particular client, invoke special features or functionality available on the client, and otherwise respond to and interact with client-specific behavior.

SUMMARY OF THE INVENTION

The present invention provides methods and apparatus, including computer program products, for selecting client adapters.

In general, in one aspect, the invention provides methods and apparatus, including computer program products, for selecting client adapters. A program according to this aspect has instructions operable to identify one or more selection data elements in a client request, where each selection data element specifies an adapter type, a client type, or data describing the client, and select an adapter to communicate with the client based on the selection data elements.

Advantageous implementations of the invention include one or more of the following features. The adapter is selected by performing a multi-stage selection process that comprises performing an adapter-request process for selecting an adapter based on the selection data elements that specify the adapter type; if the adapter-request process fails to select an adapter, performing a client-identification process for selecting an adapter based on the selection data elements that specify the client type; and if the client-identification process fails to select an adapter, performing a client-description process for selecting an adapter based on the selection data elements that specify data describing the client.

The adapter is selected from a plurality of adapters stored on a server, the plurality of adapters including one or more of a mobile adapter for a client that comprises a mobile device, an HTML adapter for a client that supports HTML, an XML adapter for a client that supports XML, an RMI adapter for a client that supports RMI, and a JavaScript adapter for a client that supports JavaScript.

The selected adapter makes use of a client capability particular to the client. The client capability comprises the capability to execute instructions in a scripting language. The operation to select an adapter comprises identifying multiple adapters suitable for communicating with the client and selecting an adapter from the multiple adapters that makes use of a particular client capability. The operation to select an adapter comprises identifying multiple adapters suitable for communicating with the client and selecting an adapter from the multiple adapters that requires the least communication with the client. The client has multiple client capabilities, and the operation to select an adapter comprises identifying multiple adapters suitable for communicating with the client and selecting an adapter from the multiple adapters that is operable to make use of the greatest set of the multiple client capabilities.

The client-identification process comprises looking up the specification of the client type in a table. The specification of the client type comprises a specification of a browser and version number.

The client-description process comprises using the specification of data describing the client to identify a client capability. The adapter selected to communicate with the client conforms to the client capability. The client capability is a screen size.

The invention can be implemented to realize one or more of the following advantages. The client abstraction layer hides client-specific behavior from server applications, and it enables the applications to be designed and to execute in a client-independent manner.

The use of multiple selection processes improves the efficiency of selecting an appropriate client adapter. Indirect and more time-consuming processes (e.g., selecting an adapter to match the capabilities of a client) are used only when less direct processes (e.g., selecting an adapter specifically requested by a client) have failed. The use of multiple selection processes can also result in the identification and selection of adapters that match the client types more closely (e.g., adapters that invoke special functionality or features available on a particular client type, and that generally support the richest functionality provided by the client types). The selection of adapters that take advantage of client-specific functionality, and that match client types closely can reduce the amount of data that needs to be transmitted between clients and servers, and lower the bandwidth required to run applications. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
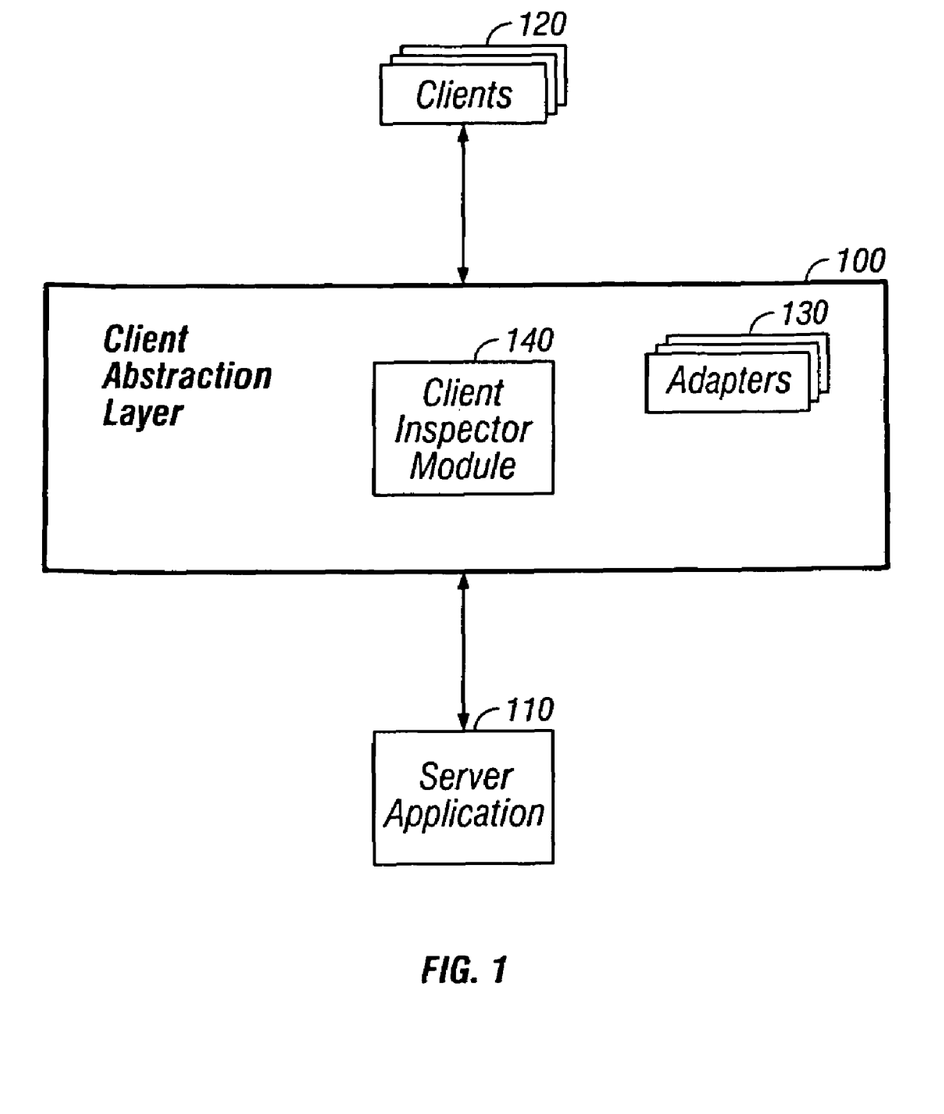
FIG. 1 is a block diagram of a client abstraction layer.

FIG. 1 shows a client abstraction layer 100. The client abstraction layer 100 is a software layer that acts as an intermediary between a server application 110 and client programs 120 that have requested a connection with the server application 110. The client programs can include a mixture of different types of client programs with different capabilities. Examples of client programs 120 include web-based browser programs (e.g., Internet Explorer or Netscape Navigator), character-based user interface programs (e.g., VT100 terminal emulation), and mobile or wireless applications that run on personal digital assistants (PDAs) or other mobile devices. The server application 110 can be any application that provides services to client programs 120. In one implementation, the server application 110 can be any business application (e.g., a customer relationship management (CRM) application), and the server on which the application 110 runs can be a web application server (e.g., the Web Application Server 6.30, available from SAG AG, of Walldorf, Germany).

The client abstraction layer 100 hides client-specific behavior from the applications running on the server. The client abstraction layer 100 uses adapters 130 as intermediaries between an application 110 and client programs 120. The adapters 130 convert the communication between the application and the client programs from a client-independent format into a client-specific format (and vice versa). For example, adapters 130 can format an application user interface for display on a particular client, invoke special features or functionality on the client, and respond to and interact with client-specific behavior. The adapters 130 include a variety of different types of adapters. Each type of adapter is designed for use with a particular type of client. For example, in one implementation, the adapters 130 can include a mobile adapter for mobile applications, an RMI (Java Remote Method Invocation) adapter for applications that use RMI, an XML (Extensible Markup Language) adapter for applications that use XML and an HTML (Hypertext Markup Language) adapter for applications that use HTML.

For each type of adapter, different versions of the adapter can be used for clients with different capabilities. For example, there can be two versions of the mobile adapter, one for mobile devices with small screens and one for mobile devices with large screens. There can also be different versions of an HTML adapter for clients that use different versions of HTML or different HTML browsers. One version of an HTML adapter, which will be referred to as a JavaScript adapter, requires a Web browser that supports JavaScript (e.g., Internet Explorer version 5.0 or higher, or Netscape Navigator version 7.0 or higher).

When a client program 120 requests a new connection with the server application 110, a client inspector module 140 in the client abstraction layer 100 selects an adapter 130 to be used with the client program 120. In making the selection, the client inspector module 140 can use a multi-stage selection process to select an adapter for use with the client program 120. The adapter can be selected based on its use of a client capability particular to the client, for example, the capability to execute instructions in a scripting language, or the capability to support a more advanced version of HTML. If the client has multiple capabilities, the selection can involve selecting an adapter that is operable to make use of the greatest number of the client capabilities. The selection can also involve selecting an adapter that reduces the communication between the client and the server (e.g., that reduces the number of request-response cycles required to transfer information between the client and the server).

In one implementation, the client inspector module 140 uses the three-stage selection process described below.

Adapter-Request Process

Figure 2:
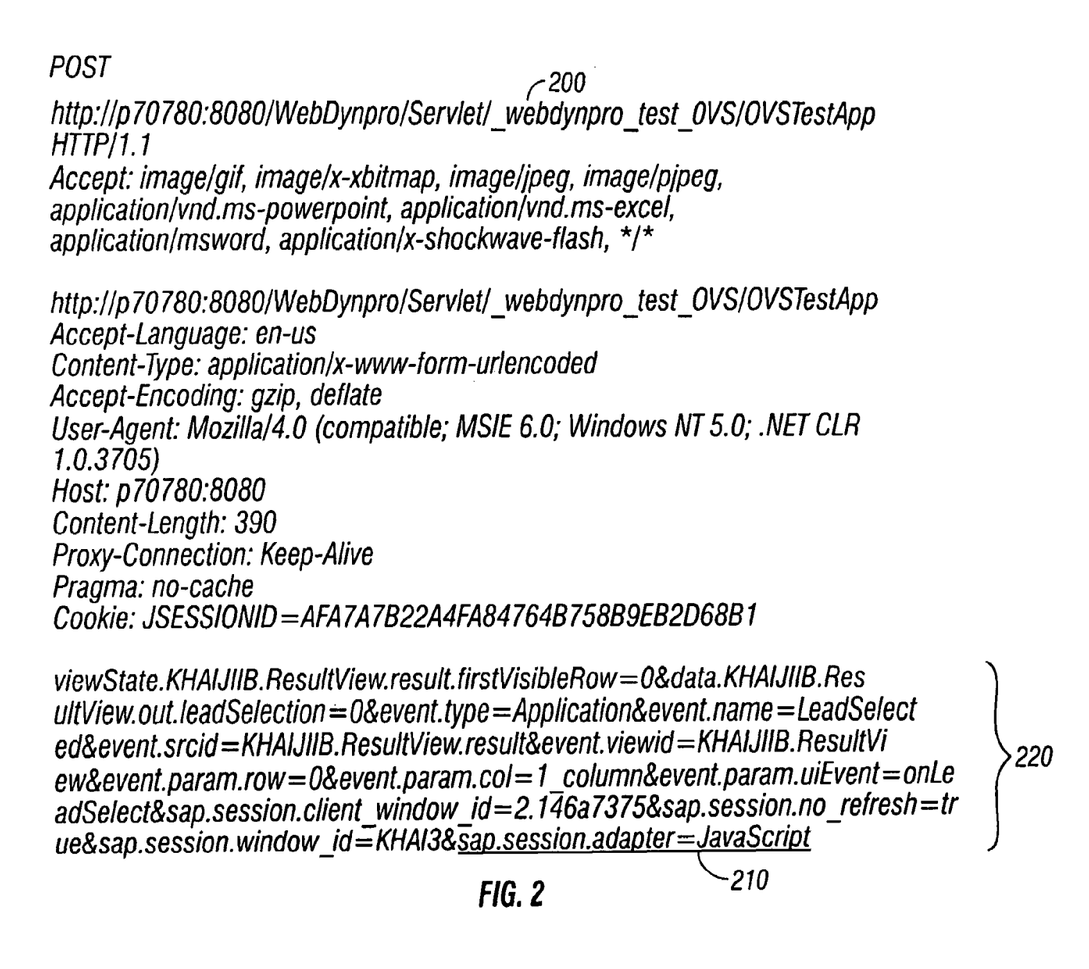
FIG. 2 is an example of a client request that contains an adapter type.

In the adapter-request process, the client inspector 140 selects an adapter 130 based on an adapter type specified in the request. The adapter type can be specified by a parameter in the request. For example, FIG. 2 shows an example of an HTTP request 200 that contains the parameter "session-.adapter" 210 as part of a set of form parameters 220 provided in the request. In this example, the parameter has the value "JavaScript". Based on this parameter value, the client inspector 140 determines that the JavaScript adapter should be selected.

Client-Identification Process

In the client-identification process, the client inspector 140 selects an adapter 130 based on a client type specified in the request. The client inspector 140 compares the specified client type to information in a property file that maps client types to adapters 130. The client inspector 140 then selects the adapter that corresponds to the specified client type.

Figure 3:
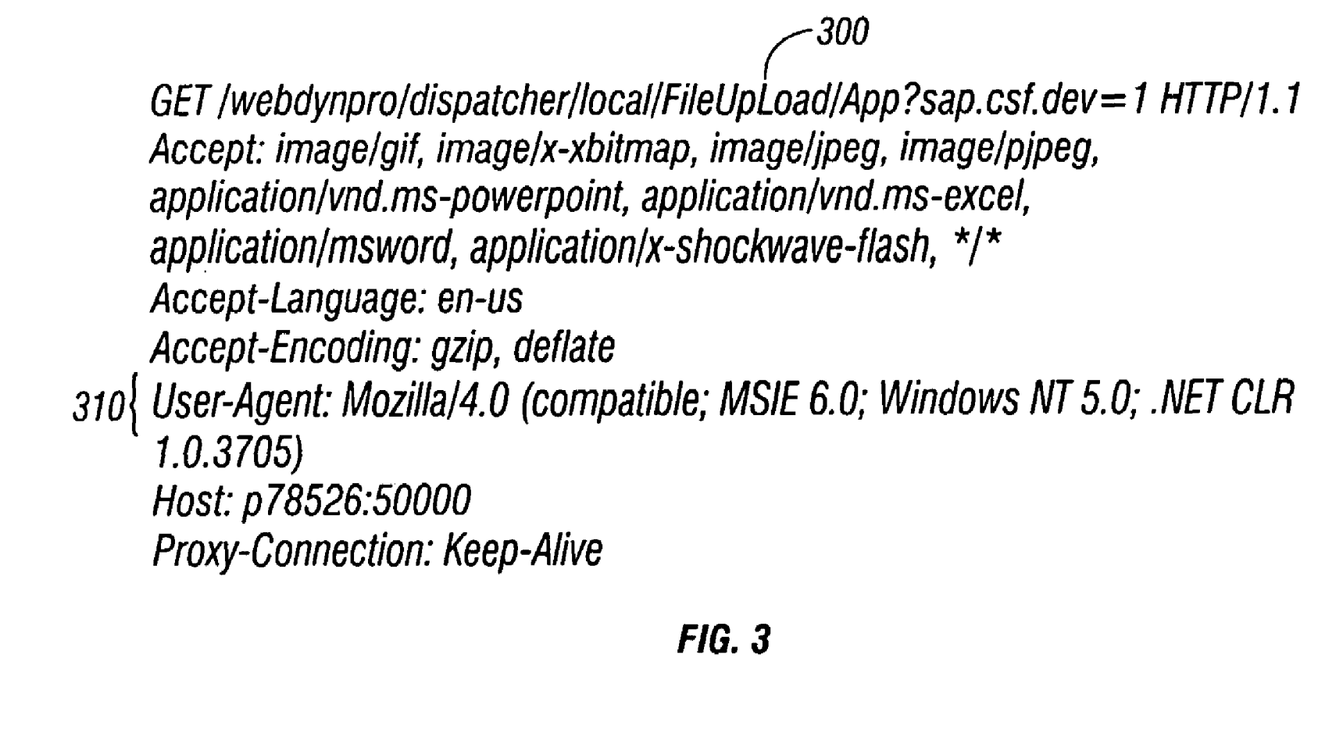
FIG. 3 is an example of a client request that contains a client type.

In one implementation, the client type specified in the request is a user agent and the property file contains information that maps each user agent to a particular adapter 130. A user agent is a device that interprets HTML documents. Examples of user agents include visual browsers (e.g., text-only and graphical), non-visual browsers (e.g., audio, Braille), search robots, and proxies. In an HTTP request, one of the fields in the request header can be a user agent field that identifies the user agent that sent the request. For example, if the client program 120 were Internet Explorer version 5.0, then the user agent field would contain the value "ie5". If the client program 120 is Netscape Navigator version 7.0, then the user-agent field can contain the value "rv:1". Each of the field values "ie5" and "rv:1" is mapped to one of the HTML adapters. FIG. 3 shows an example of an HTTP request 300 that contains a user-agent field 310.

Client-Description Process

In the client-description process, the client inspector 140 selects an adapter based on information in the request that is descriptive of the client's capabilities. The client inspector 140 selects an adapter by comparing the client's capabilities to a set of client conditions for each adapter 130. The set of client conditions specify the minimum requirements for using a particular adapter. If the client's capabilities meet the minimum requirements for the adapter, then that adapter can be selected.

In one implementation, the adapters 130 have the following client conditions. For the mobile adapter, the client device must have a particular screen size. A PDA version of the mobile adapter can require a minimum screen size of 2.25×3 inches while a mobile phone version of the mobile adapter can require a minimum screen size of 1×1.5 inches. The client inspector 140 can use a device identifier contained in the client request to determine the screen size of the client device. For an RMI adapter, the client program 120 must be able to communicate using RMI. If the client inspector 140 determines that the client request is in the format of an RMI call, then the RMI adapter can be used. For the HTML adapter, one condition is that the client program 120 must be a browser of a particular version, for example, at least version 7.0 or higher of Netscape Navigator, or version 5.0 or higher of Internet Explorer. The JavaScript version of an HTML adapter can further require that the client program 120 be able to support client-side scripting technologies, for example, JavaScript.

If the client's capabilities meet the minimum requirements for more than one adapter, then client inspector 140 can use information in a priority list to select an adapter from among the suitable adapters. The information in the priority list can rank the adapters according to pre-defined selection criteria (e.g., richness of functionality, screen size) such that the PDA adapter is ranked higher than the mobile phone adapter and the JavaScript adapter is ranked higher than the HTML adapter.

The processes specified above can be used in different combinations and sequences. In one implementation, the client inspector module 140 tries the processes that are more direct and faster first, and uses processes that are less direct and slower only if the former processes fail. For example, the client inspector module 140 can try the adapter-request process first, the client-identification process second, and the client-description process last, as shown in the method 400 illustrated in FIG. 4.

Figure 4:
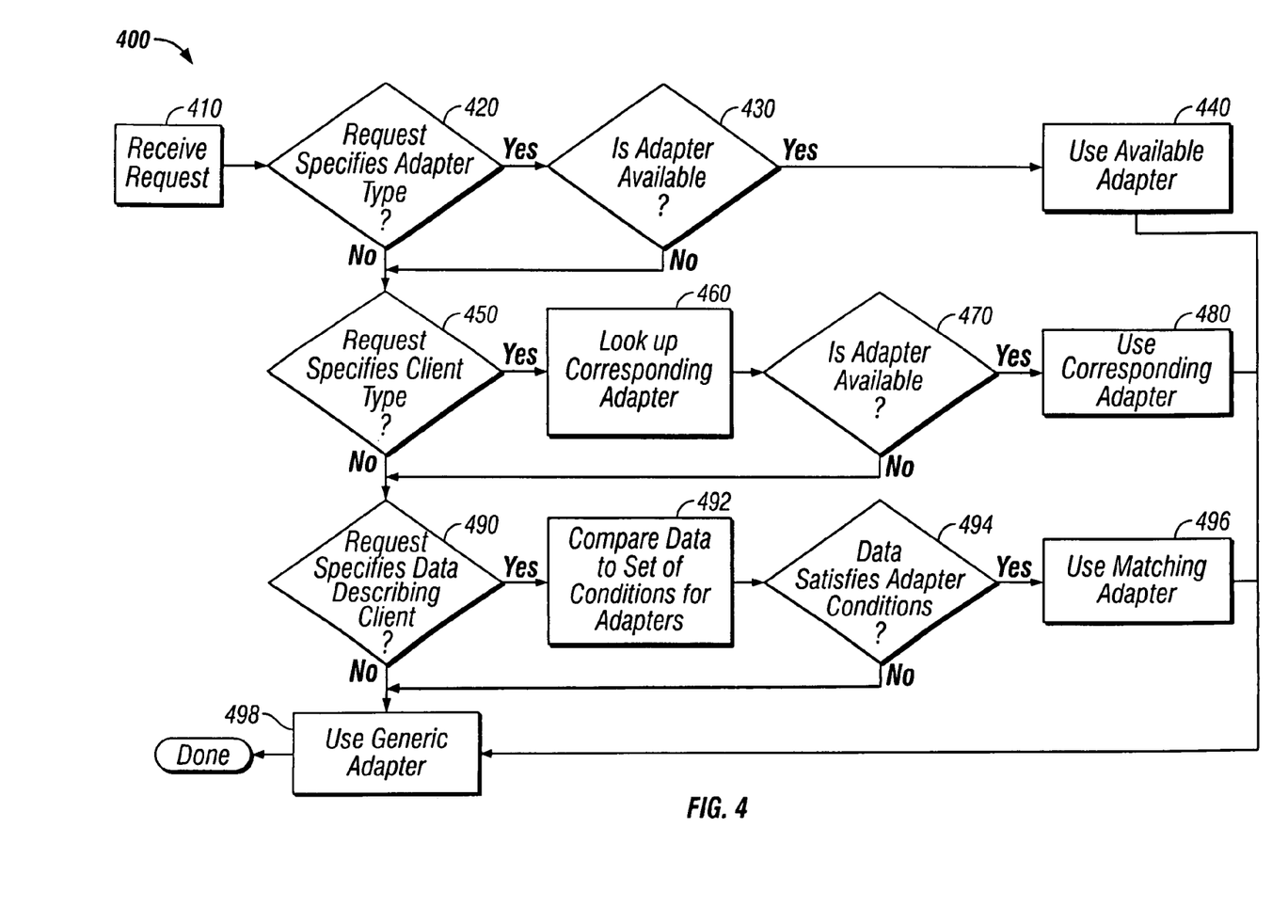
FIG. 4 is a flow diagram of a multi-stage selection process.

The method 400 begins when the client inspector 140 receives a client request to establish communication with the server (step 410). The client request may not come directly from the client computer. For example, for security reasons, the client request may be received by a proxy computer which then forwards the client request to the application server. The client inspector 140 determines whether the request specifies an adapter type (step 420). If so, then the client inspector 140 determines whether an adapter of the specified adapter type is included in the adapters 130 available to the client inspector 140 (step 430). If so, then the client inspector 140 selects the specified adapter (step 440).

If the specified adapter is not available or if no adapter type is specified, then the client inspector 140 determines whether the request specifies a client type (step 450). If so, then the client inspector 140 determines a corresponding adapter type based on information that maps client types to adapter types (step 460). The client inspector 140 then determines if an adapter of the corresponding adapter type is available (step 470). If so, the client inspector 140 selects this adapter (step 480).

If a corresponding adapter is not available or if a client type is not specified, then the client inspector 140 determines whether the request specifies data descriptive of the client capabilities (step 490). If so, the client inspector 140 compares the data to a set of client conditions for each adapter 130 to determine a matching adapter (step 492). The client inspector 140 then determines if the matching adapter is available (step 494). If so, the client inspector 140 selects the matching adapter (step 496). If the matching adapter is not available, or if no matching adapter is found based on the comparison, or if no data descriptive of the client capabilities is found in the request, then the client inspector 140 selects a generic adapter (step 498).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine-readable storage device, the computer program product comprising instructions operable to cause data processing apparatus to:

identify at a client abstraction layer on a server, one or more selection data elements in a client request received at the client abstraction layer, where the one or more selection data elements specify an adapter type; and use the selection data elements to select an adapter at the client abstraction layer to convert communication data between an application running on the server and one or more client programs, the adapter being used by the client abstraction layer as an intermediary, the adapter hiding client-specific behavior from the application running on the server, the adapter being designed for use with a particular client program, wherein the adapter is selected from one or more suitable adapters based on a priority list, wherein the priority list ranks the plurality of adapters according to pre-defined criteria.

2. The product of claim 1, wherein the instructions to select an adapter comprise instructions to:
perform a multi-stage selection process to select an adapter, the multi-stage selection process comprising:
performing an adapter-request process for selecting an adapter based on the selection data elements that specify the adapter type;
if the adapter-request process fails to select an adapter, performing a client-identification process for selecting an adapter based on the selection data elements that specify the client type; and
if the client-identification process fails to select an adapter, performing a client-description process for selecting an adapter based on the selection data elements that specify data describing the client.

3. The product of claim 2, wherein the client-identification process comprises:
using the specification of data describing the client to identify a client capability; and
wherein the adapter selected to communicate with the client conforms to the client capability.

4. The product of claim 3, wherein the client capability is a screen size.

5. The product of claim 2, wherein the client-identification process comprises looking up the specification of the client type in a table.

6. The product of claim 1, wherein the selected adapter makes use of a client capability particular to the client.

7. The product of claim 6, wherein the client capability comprises the capability to execute instructions in a scripting language.

8. The product of claim 1, wherein the operation to select an adapter comprises:
identifying multiple adapters suitable for communicating with the client; and
selecting an adapter from the multiple adapters that makes use of a particular client capability.

9. The product of claim 1, wherein the operation to select an adapter comprises:
identifying multiple adapters suitable for communicating with the client; and
selecting an adapter from the multiple adapters that requires the least communication with the client.

10. The product of claim 1, wherein the client has multiple client capabilities, and wherein the operation to select an adapter comprises:
identifying multiple adapters suitable for communicating with the client; and
selecting an adapter from the multiple adapters that is operable to make use of the greatest number of the multiple client capabilities.

11. The product of claim 1, wherein the adapter is selected from a plurality of adapters stored on a server, the plurality of adapters including one or more of a mobile adapter for a client that comprises a mobile device, an HTML adapter for a client that supports HTML, an XML adapter for a client that supports XML, an RMI adapter for a client that supports RMI, and a JavaScript adapter for a client that supports JavaScript.

12. The product of claim 1, wherein the specification of the client type comprises a specification of a browser and version number.

13. A system comprising:
a server having a processor and memory operable to run an application;
a plurality of client-specific adapters, each adapter in the plurality enabling communication between the application on the server and a client; and
a client abstraction layer on the server operable to:
identify one or more selection data elements in a client request received at the client abstraction layer, where the one or more selection data elements specify an adapter type; and
use the selection data elements to select an adapter at the client abstraction layer to enable communication between an application running on the server and one or more client programs, the adapter being used by the client abstraction layer as an intermediary, the adapter hiding client-specific behavior from the application running on the server, the adapter being designed for use with a particular client program,
wherein the adapter is selected from one or more suitable adapters based on a priority list, wherein the priority list ranks the plurality of adapters according to pre-defined criteria.

14. The system of claim 13, wherein the operation to select an adapter comprises:
performing a multi-stage selection process to select an adapter, the multi-stage selection process comprising:
performing an adapter-request process for selecting an adapter based on the selection data elements that specify the adapter type;
if the adapter-request process fails to select an adapter, performing a client-identification process for selecting an adapter based on the selection data elements that specify the client type; and
if the client-identification process fails to select an adapter, performing a client-description process for selecting an adapter based on the selection data elements that specify data describing the client.

15. The system of claim 13, wherein the adapter is selected from a plurality of adapters stored on a server, the plurality of adapters including one or more of a mobile adapter for a client that comprises a mobile device, an HTML adapter for a client that supports HTML, an XML adapter for a client that supports XML, an RMI adapter for a client that supports RMI, and a JavaScript adapter for a client that supports JavaScript.

16. A method comprising:
identifying at a client abstraction layer executing on a server, said server having a processor and memory, one or more selection data elements in a client request received at the client abstraction layer, where the one or more selection data elements specify an adapter type; and
using the selection data elements to select an adapter at the client abstraction layer to convert communication data between an application running on the server and one or more client programs, the adapter being used by the client abstraction layer as an intermediary, the adapter hiding client-specific behavior from the application running on the server, the adapter being designed for use with a particular client program,
wherein the adapter is selected from one or more suitable adapters based on a priority list, wherein the priority list ranks the plurality of adapters according to pre-defined criteria.

17. The method of claim 16, wherein selecting an adapter comprises:

performing a multi-stage selection process to select an adapter, the multi-stage selection process comprising:

performing an adapter-request process for selecting an adapter based on the selection data elements that specify the adapter type;

if the adapter-request process fails to select an adapter, performing a client-identification process for selecting an adapter based on the selection data elements that specify the client type; and if the client-identification process fails to select an adapter, performing a client-description process for selecting an adapter based on the selection data elements that specify data describing the client.

18. An apparatus comprising:

means for identifying at a client abstraction layer on a server having a processor and memory, one or more selection data elements in a client request received at the client abstraction layer, where the one or more selection data elements specify an adapter type; and means for using the data elements to elect an adapter at the client abstraction layer to convert communication data between an application running on the server and one or more client programs, the adapter being used by the client abstraction layer as an intermediary, the adapter hiding client-specific behavior from the application running on the server, the adapter being designed for use with a particular client program, wherein the adapter is selected from one or more suitable adapters based on a priority list, wherein the priority list ranks the plurality of adapters according to pre-defined criteria.

19. The apparatus of claim 18, wherein the means for selecting an adapter comprises:

performing a multi-stage selection process to select an adapter, the multi-stage selection process comprising:

performing an adapter-request process for selecting an adapter based on the selection data elements that specify the adapter type;

if the adapter-request process fails to select an adapter, performing a client-identification process for selecting an adapter based on the selection data elements that specify the client type; and if the client-identification process fails to select an adapter, performing a client-description process for selecting an adapter based on the selection data elements that specify data describing the client.

20. The apparatus of claim 18, wherein the adapter is selected from a plurality of adapters stored on a server, the plurality of adapters including one or more of a mobile adapter for a client that comprises a mobile device, an HTML adapter for a client that supports HTML, an XML adapter for a client that supports XML, an RMI adapter for a client that supports RMI, and a JavaScript adapter for a client that supports JavaScript.

21. A method of selecting an adapter for converting communication data between a plurality of client programs and a server application comprising:

at a client abstraction layer executing on a server, said server having a processor and memory, receiving a connection request from a client program to begin a new connection with the server application, wherein the client abstraction layer hides the client-specific behavior of the client program from the server application, wherein the client abstraction layer is an intermediary between the client program and the server application; and executing a multi-stage selection process wherein the process comprises:

selecting a first process from a plurality of processes based on one or more selection data elements in the connection request, wherein the one or more selection data elements specify an adapter type; and selecting the adapter from a plurality of adapters based on the selected first process, wherein each adapter from the plurality of adapters is designed for use with a particular type of client, wherein the selected first process comprises selecting the adapter based on the specified adapter type based on a priority list, wherein the priority list ranks the plurality of adapters according to pre-defined criteria.

22. The method of claim 21 wherein, if the first process fails to select an adapter, then selecting another process, wherein a second process from the plurality of processes comprises:

receiving a client type specified in the connection request;

mapping the client type to the adapter, wherein the mapping performs a query in a property file that maps a plurality of client types to a plurality of adapters; and selecting the adapter corresponding to the client type.

23. The method of claim 22, wherein a third process from the plurality of processes comprises:

receiving information descriptive of the client's capabilities in the connection request;

receiving a set of client conditions for each adapter belonging to the plurality of adapters, wherein the set of client conditions specify the minimum requirements for using that particular adapter; and selecting one or more adapters that meet the client conditions.

* * * * *